US010515624B2

(12) United States Patent
Jeong et al.

(10) Patent No.: US 10,515,624 B2
(45) Date of Patent: Dec. 24, 2019

(54) CONTENT PROCESSING METHOD AND SYSTEM USING AUDIO SIGNAL OF ADVERTISEMENT DATA

(71) Applicant: Electronics and Telecommunications Research Institute, Daejeon (KR)

(72) Inventors: Young Ho Jeong, Daejeon (KR); Seung Kwon Beack, Daejeon (KR); Tae Jin Lee, Daejeon (KR); Jin Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 112 days.

(21) Appl. No.: 15/654,873

(22) Filed: Jul. 20, 2017

(65) Prior Publication Data

US 2018/0261212 A1  Sep. 13, 2018

(30) Foreign Application Priority Data

Mar. 10, 2017  (KR) .................. 10-2017-0030410

(51) Int. Cl.
| | |
|---|---|
| *G10L 15/08* | (2006.01) |
| *G10L 25/48* | (2013.01) |
| *G06Q 30/02* | (2012.01) |
| *G06F 16/68* | (2019.01) |
| *G10L 19/018* | (2013.01) |
| *G10L 25/69* | (2013.01) |

(52) U.S. Cl.
CPC ............ *G10L 15/083* (2013.01); *G06F 16/68* (2019.01); *G06Q 30/0241* (2013.01); *G10L 19/018* (2013.01); *G10L 25/48* (2013.01); *G10L 25/69* (2013.01)

(58) Field of Classification Search
USPC .................................................. 704/251–253
See application file for complete search history.

(56) References Cited

U.S. PATENT DOCUMENTS

| 10,075,767 B2* | 9/2018 | Husain ............. H04N 21/44218 |
| 2010/0228630 A1* | 9/2010 | Mikkelsen ............. G06Q 30/02 |
| | | 705/14.66 |
| 2011/0194838 A1* | 8/2011 | Meijer .................. H04N 5/445 |
| | | 386/249 |

(Continued)

FOREIGN PATENT DOCUMENTS

| JP | 2012-74119 A1 | 4/2012 |
| KR | 10-0611412 B1 | 8/2006 |

(Continued)

*Primary Examiner* — Leonard Saint Cyr
(74) *Attorney, Agent, or Firm* — NSIP Law

(57) ABSTRACT

Disclosed is a content processing method including receiving content including broadcast data and advertisement data into which additional information is inserted, extracting the additional information from the advertisement data, identifying the advertisement data from the content based on the extracted additional information, and extracting the broadcast data excluding the advertisement data identified from the content, wherein the additional information is inserted at at least one of optimal intervals determined based on test additional information inserted at a plurality of analysis intervals of an audio signal associated with the advertisement data.

18 Claims, 6 Drawing Sheets

(56) References Cited

U.S. PATENT DOCUMENTS

| | | | |
|---|---|---|---|
| 2011/0197224 A1* | 8/2011 | Meijer | G06Q 30/02 |
| | | | 725/34 |
| 2013/0322633 A1* | 12/2013 | Stone | H04S 3/00 |
| | | | 381/2 |
| 2015/0229995 A1* | 8/2015 | Haberman | H04N 21/812 |
| | | | 725/14 |
| 2016/0205443 A1* | 7/2016 | Ghadi | H04N 21/812 |
| | | | 725/34 |
| 2016/0337691 A1* | 11/2016 | Prasad | H04N 21/812 |
| 2018/0035174 A1* | 2/2018 | Littlejohn | H04N 21/8358 |

FOREIGN PATENT DOCUMENTS

| | | |
|---|---|---|
| KR | 10-0850918 B1 | 8/2008 |
| KR | 10-2011-0123410 A | 11/2011 |
| KR | 10-2011-0129325 A | 12/2011 |

\* cited by examiner

FIG. 2

| Advertisement data | Advertisement data | Broadcast data | Advertisement data | Advertisement data | Broadcast data | Advertisement data | Advertisement data |

CONTENT PROCESSING METHOD AND SYSTEM USING AUDIO SIGNAL OF ADVERTISEMENT DATA

CROSS-REFERENCE TO RELATED APPLICATION(S)

This application claims the priority benefit of Korean Patent Application No. 10-2017-0030410 filed on Mar. 10, 2017, in the Korean Intellectual Property Office, the disclosure of which is incorporated herein by reference for all purposes.

BACKGROUND

1. Field

One or more example embodiments relate to a method and system for extracting data by inserting additional information into an audio signal of advertisement data.

2. Description of Related Art

Recently, an automatic content recognition (ACR) technology for recognizing content to be watched, providing information on the content, and providing a related interactive service, has been widely used. ACR technology includes fingerprint technology, watermark technology, and acoustic data transmission (ADT) technology.

The finger print technology may use a database including feature data obtained through audio signal processing in advance without changing an audio signal associated with content. However, in this case, there is a disadvantage in that an additional database needs to be provided for new content and for a large amount of other content which is provided in advance.

For the watermark technology and the ADT technology, it is unnecessary to provide a database, unlike the fingerprint technology. These technologies may insert additional information into an audio signal. However, in this case, audio quality may deteriorate due to the additional information, and an error may occur in a process of encoding and decoding an audio signal into which additional information is inserted.

Thus, a method of extracting desired data without building a database, without causing audio quality to deteriorate, and without causing an error, is being requested.

SUMMARY

An aspect provides a method and system for determining an interval, as an optimal interval, during which an error occurring due to additional information is absent and an audio quality deterioration is minimized among analysis intervals of an audio signal associated with pre-created advertisement data included in content, inserting the additional information for identifying the advertisement data included in the content at the determined optimal interval, identifying the advertisement data from the content based on the inserted additional information, and extracting broadcast data excluding the advertisement data.

According to an aspect, there is provided a content processing method including receiving content including broadcast data and advertisement data into which additional information is inserted, extracting the additional information from the advertisement data, identifying the advertisement data from the content based on the extracted additional information, and extracting the broadcast data excluding the advertisement data identified from the content, wherein the additional information is inserted at at least one of optimal intervals determined based on test additional information inserted at a plurality of analysis intervals of an audio signal associated with the advertisement data.

The additional information may include identification information for searching for the additional information, time information for indicating positions of the optimal intervals at which the additional information is inserted, and time difference information for indicating a time difference between a starting point in time of the audio signal, an ending point in time of the audio signal, and the positions of the optimal intervals.

The advertisement data may be created in advance and have a preset play time.

The optimal intervals may be intervals during which an error occurring due to the test additional information is absent and an audio quality deterioration caused by the test additional information is minimized Whether the error occurs may be determined based on a bit error rate (B ER) depending on the test additional information.

A degree of the audio quality deterioration may be determined based on an objective difference grade (ODG) using a perceptual evaluation of audio quality (PEAQ) depending on the test additional information.

The extracting of the additional information may include extracting the additional information by searching for analysis intervals of a first portion of the audio signal, and extracting the additional information from analysis intervals of a last portion of the audio signal by priorly searching for an interval subsequent to a preset search time from the optimal intervals at which the extracted additional information is inserted among the analysis intervals of the first portion.

The identifying of the advertisement data may include identifying a point in time for the optimal intervals at which the extracted additional information is inserted, and identifying a starting point in time and an ending point in time of the advertisement data based on the identified point in time for the optimal intervals and time difference information included in the additional information.

According to another aspect, there is provided a content processing system including a processor, wherein the processor is configured to receive content including broadcast data and advertisement data into which additional information is inserted, extract the additional information from the advertisement data, identify the advertisement data from the content based on the extracted additional information, and extract the broadcast data excluding the advertisement data identified from the content, and the additional information is inserted at at least two of optimal intervals determined based on test additional information inserted at a plurality of analysis intervals of an audio signal associated with the advertisement data.

The processor may be configured to extract the additional information by searching for analysis intervals of a first portion of the audio signal, and extract the additional information from analysis intervals of a last portion of the audio signal by priorly searching for an interval subsequent to a preset search time from the optimal intervals at which the extracted additional information is inserted among the analysis intervals of the first portion.

The processor may be configured to determine a point in time for the optimal intervals at which the extracted additional information is inserted, and identify a starting point in time and an ending point in time of the advertisement data based on the identified point in time for the optimal intervals and time difference information included in the additional information.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 2 illustrates a structure of content according to an example embodiment;

DETAILED DESCRIPTION

Figure 1:
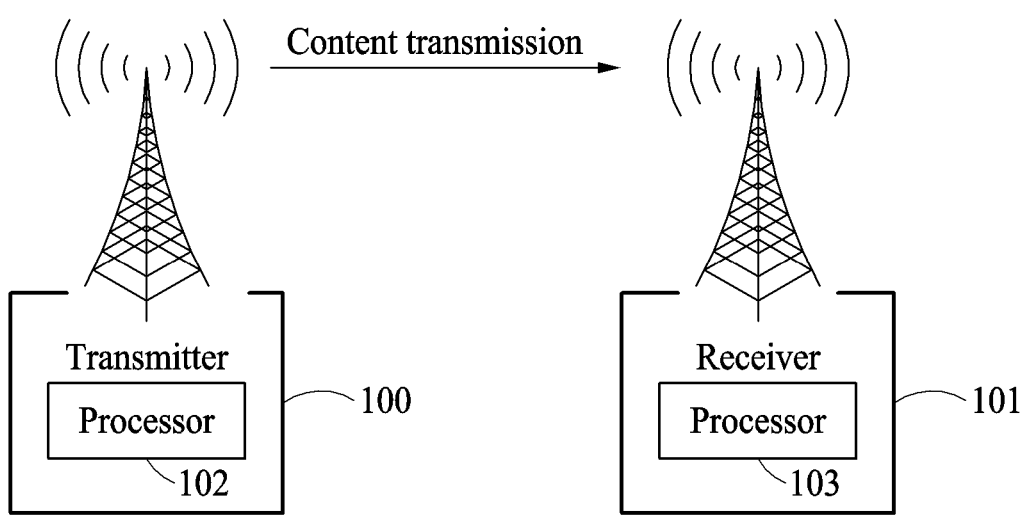
FIG. 1 illustrates a content processing system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 illustrates a content processing system according to an example embodiment.

Content may be transmitted from a transmitter 100 and received by a receiver 101.

The transmitter 100 includes a processor 102. The processor 102 may insert additional information into the content.

The receiver 101 includes a processor 103. The processor 101 may process the content into which the additional information is inserted.

FIG. 2 illustrates a structure of content according to an example embodiment.

The content includes advertisement data and broadcast data. The broadcast data may be provided between pieces of advertisement data.

The advertisement data is created in advance and has a preset play time. In an example, the advertisement data may have a predetermined play time, for example, 15 seconds and 20 seconds. In addition, additional information for identifying the advertisement data may be inserted at an analysis interval of an audio signal associated with the advertisement data. Here, the additional information may be inserted at optimal intervals determined based on test additional information among analysis intervals of the audio signal.

The additional information may include identification information for searching for the additional information, time information for indicating positions of optimal intervals at which the additional information is inserted, and time difference information for indicating a time difference between a starting point in time of the audio signal, an ending point in time of the audio signal, and the positions of the optimal intervals.

Figure 3:
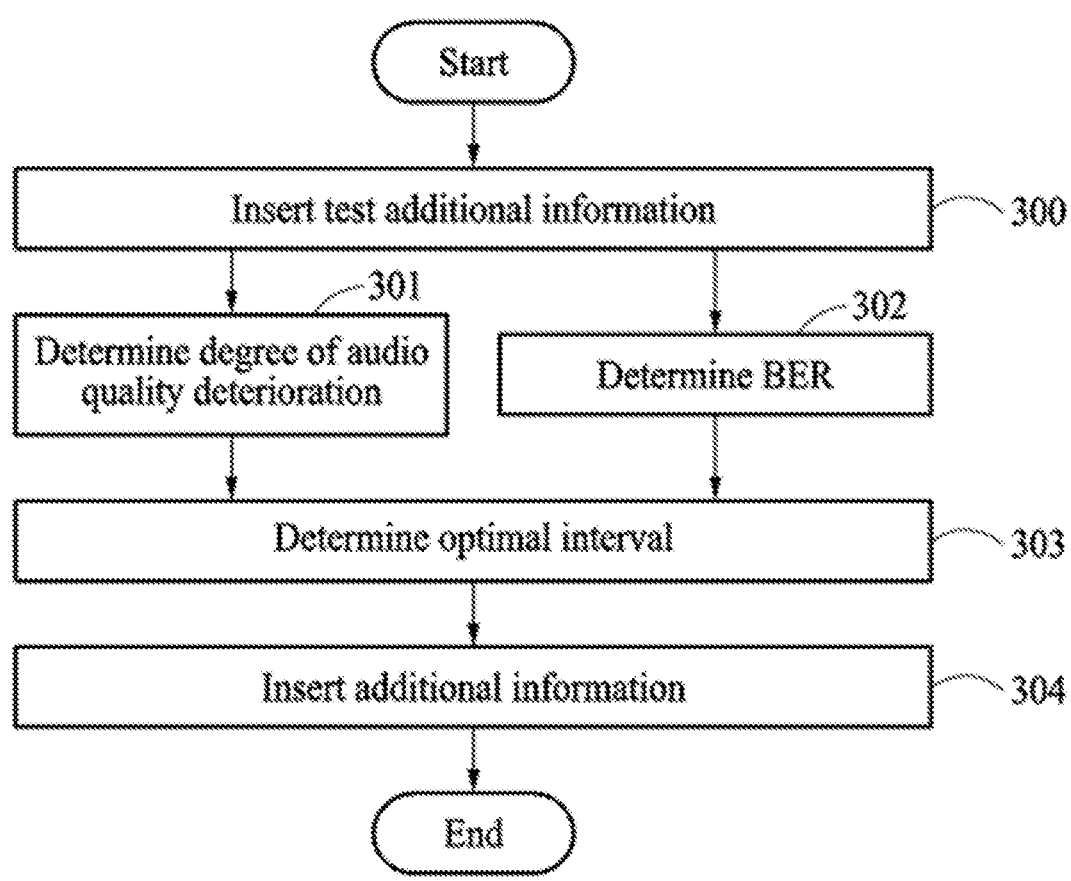
FIG. 3 is a flowchart illustrating a method of inserting additional information according to an example embodiment.

FIG. 3 is a flowchart illustrating a method of inserting additional information according to an example embodiment.

In operation 300, the processor 102 inserts test additional information to all analysis intervals of an audio signal for determining optimal intervals at which additional information is inserted among the analysis intervals of the audio signal associated with advertisement data. Here, an audio watermark technology and a sound data transmission technology may be used to insert the test additional information into the audio signal. Also, the audio signal into which the test additional information is inserted may be encoded and decoded based on broadcast system specifications for compression and restoration.

In operation 301, the processor 102 may determine an objective difference grade (ODG) indicating a degree of audio quality deterioration for each of the analysis intervals of the audio signal based on a perceptual evaluation of audio quality (PEAQ) which is a method of evaluating an audio quality based on an original audio signal of advertisement data and the encoded and decoded audio signal. Here, the ODG may range from 0 to −4. Here, −4 indicates that the degree of audio quality deterioration is great, and 0 indicates that the audio quality deterioration is undetectable.

In operation 302, the processor 102 determines a bit error rate (BER) based on the encoded and decoded audio signal. In response to the BER corresponding to 0, it indicates that an error does not occur.

In operation 303, the processor 102 determines an optimal interval during which deterioration of the audio signal occurring due to the insertion of additional information for identifying the advertisement data is least based on the determined BER and the determined ODG. That is, an interval during which the BER corresponds to 0 and the ODG is greatest may be determined to be an optimal interval.

In operation 304, the processor 102 inserts the additional information for identifying the advertisement data at the determined optimal interval.

Figure 4:
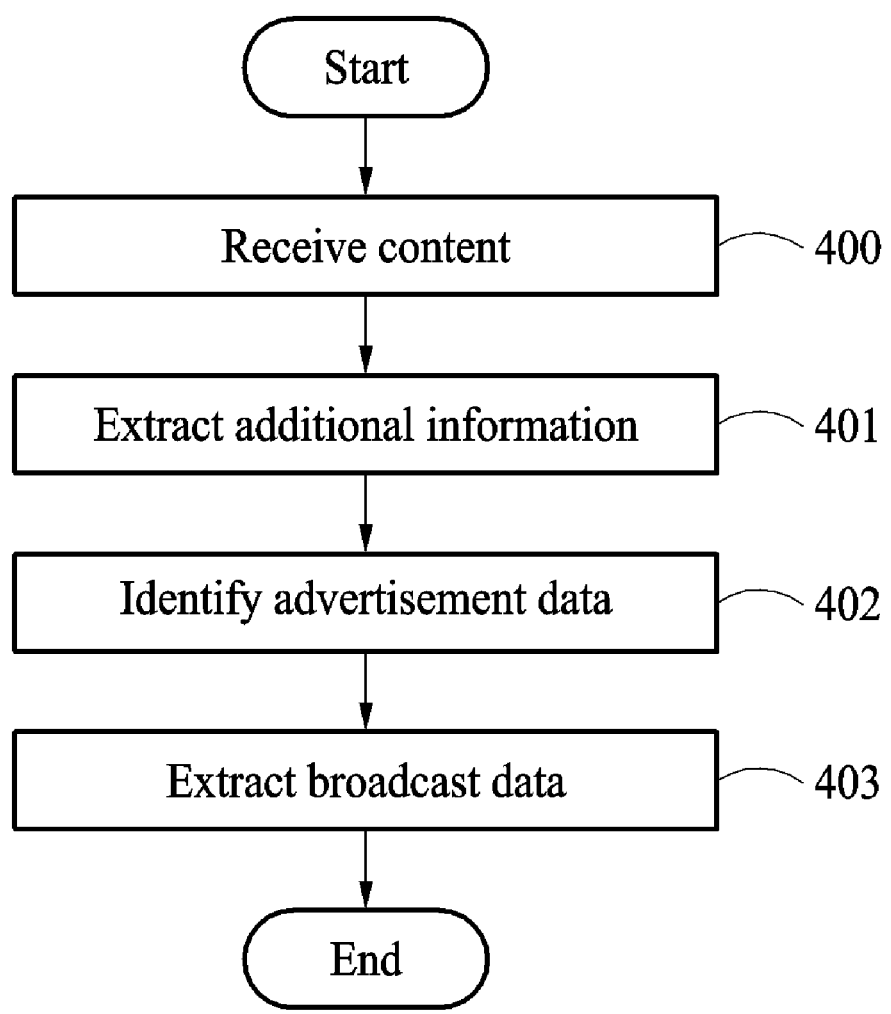
FIG. 4 is a flowchart illustrating a method of processing content according to an example embodiment.

FIG. 4 is a flowchart illustrating a method of processing content according to an example embodiment.

In operation 400, the receiver 101 receives content transmitted by the transmitter 100. Here, the content received by the receiver 101 may include broadcast data and advertisement data in which additional information for identifying the advertisement data is inserted into an audio signal.

In operation 401, the processor 103 extracts the additional information by searching for the additional information included in the audio signal associated with the advertisement data included in the content received by the receiver 101.

In more detail, the processor 103 may extract the additional information inserted at optimal intervals of the audio signal based on identification information included in the additional information by searching for analysis intervals of the audio signal. When the extracted additional information is inserted at optimal intervals of a first portion of the audio signal, the processor 103 may extract the additional information inserted at the optimal intervals of a last portion of the audio signal by priorly searching for the analysis intervals subsequent to a preset search time from the optimal intervals at which the extracted additional information is inserted.

In addition, when the extracted additional information is inserted at the optimal intervals of the last portion of the audio signal, the processor 103 may extract the additional information inserted at the optimal intervals of the first portion of the audio signal by priorly searching for analysis intervals prior to the preset search time from the optimal intervals at which the extracted additional information is inserted. Here, an amount of time used to extract the additional information may be reduced by priorly searching for the analysis intervals subsequent to the preset search time and thus, the additional information inserted at the optimal intervals of the last portion of audio signal may be extracted in a less amount of time. Here, an amount of search time may be less than an amount of play time of the advertisement data.

In operation 402, the processor 103 identifies the advertisement data based on time information and time difference information included in the extracted additional information.

In more detail, the processor 103 may identify a point in time associated with a position of an optimal interval based on the time information included in the extracted additional information. Also, based on a result of identifying the point in time associated with the position of the optimal interval that the optimal interval is positioned on the first portion of the audio signal, the processor 103 may determine a starting point in time of the advertisement data based on the time difference information included in the additional information.

Based on the result of identifying the point in time associated with the position of the optimal interval that the optimal interval is positioned on the last portion of the audio signal, the processor 103 may determine an ending point in time of the advertisement data based on the time difference information included in the additional information. Also, the processor 103 may identify that which portion of the content corresponds to the advertisement data based on the determined starting point in time and the determined ending point in time of the advertisement data.

In operation 403, the processor 103 extracts broadcast data excluding the advertisement data identified from the content received by the receiver 101.

Figure 5:
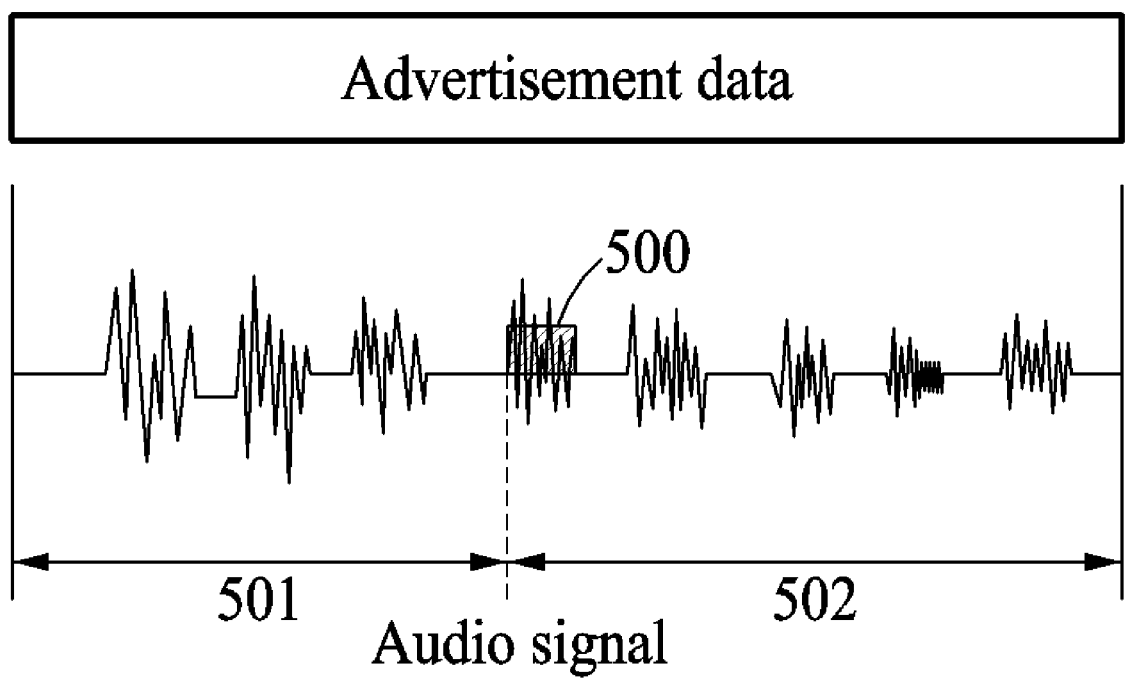
FIG. 5 illustrates a structure of advertisement data in which additional information is inserted into an audio signal according to an example embodiment.

FIG. 5 illustrates a structure of advertisement data in which additional information is inserted into an audio signal according to an example embodiment.

An audio signal of the advertisement data may include an optimal interval 500 during which a bit error rate (BER) corresponds to 0 and an objective difference grade (ODG) is greatest among analysis intervals.

A starting point in time of the optimal interval 500 may correspond to a point in time distanced from a point in time of advertisement data by a time difference 501. The starting point in time of the optimal interval 500 may correspond to a point in time distanced from an ending point in time of the advertisement data by a time difference 502.

The processor 103 may identify additional information included in the optimal interval 500, and determine the starting point in time of the advertisement data based on time information indicating a position of the optimal interval 500 included in the additional information and time difference information indicating the time difference 501 between the starting point in time of the advertisement data and the starting point in time of the optimal interval 500. The processor 103 may determine the ending point in time of the advertisement data based on the time information indicating the position of the optimal interval 500 and the time difference information indicating the time difference 502 between the ending point in time of the advertisement data and the starting point in time of the optimal interval 500.

Figure 6:
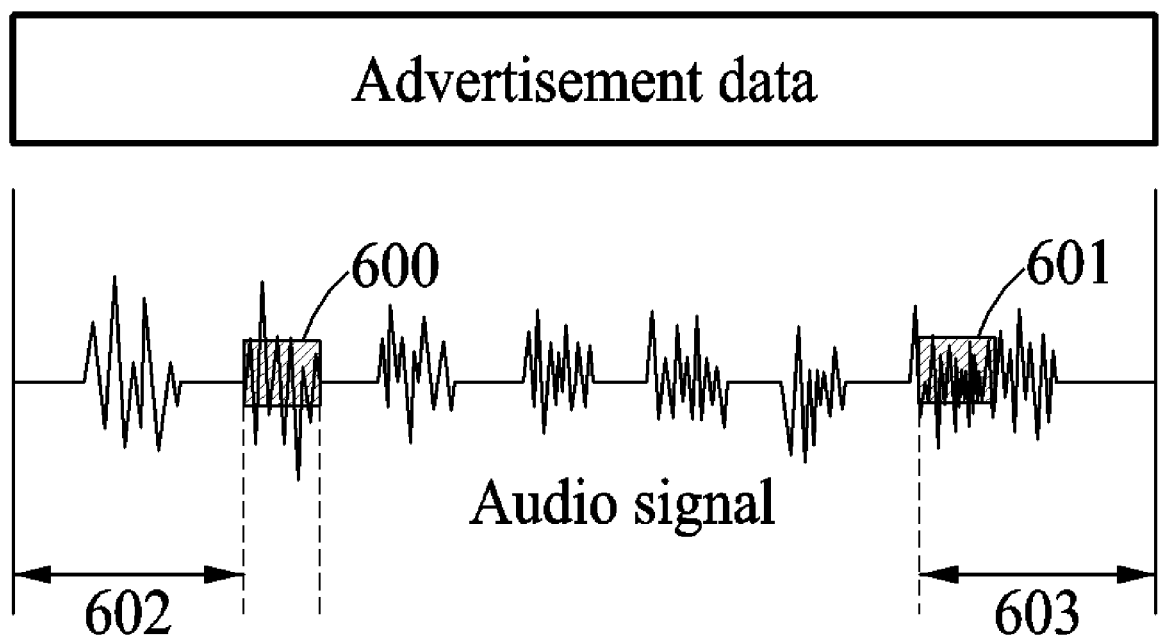
FIG. 6 illustrates a structure of advertisement data in which additional information is inserted into an audio signal according to another example embodiment.

FIG. 6 illustrates a structure of advertisement data in which additional information is inserted into an audio signal according to another example embodiment.

An audio signal of the advertisement data may include optimal intervals 600 and 601 during which each bit error rate (BER) corresponds to 0 and each objective difference grade (ODG) is greatest among analysis intervals.

A starting point in time of the optimal interval 600 may correspond to a point in time distanced from a point in time of the advertisement data by a time difference 602. A starting point in time of the optimal interval 601 may correspond to a point in time distanced from a point in time of an ending point in time of the advertisement data by a time difference 603.

The processor 103 may identify additional information included in the optimal interval 600, and determine the starting point in time of the advertisement data based on time information indicating a position of the optimal interval 600 included in the additional information and time difference information indicating the time difference 602 between the starting point in time of the advertisement data and the starting point in time of the optimal interval 600. The processor 103 may identify the additional information included in the optimal interval 601, and determine the ending point in time of the advertisement data based on the time information indicating a position of the optimal interval 601 included in the additional information and time difference information indicating the time difference 603 between the starting point in time of the optimal interval 601 and the ending point in time of the advertisement data.

According to example embodiments described herein, it is possible to determine an interval, as an optimal interval, during which an error occurring due to additional information is absent and an audio quality deterioration is minimized among analysis intervals of an audio signal associated with pre-created advertisement data included in content, insert the additional information for identifying the advertisement data included in the content at the determined optimal interval, identify the advertisement data from the content based on the inserted additional information, and extract broadcast data excluding the advertisement data.

The components described in the exemplary embodiments of the present invention may be achieved by hardware components including at least one Digital Signal Processor (DSP), a processor, a controller, an Application Specific Integrated Circuit (ASIC), a programmable logic element such as a Field Programmable Gate Array (FPGA), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A processor-implemented content processing method, the method comprising:
   receiving content including broadcast data and advertisement data;
   extracting additional information from the received content;
   identifying the advertisement data in the content based on the extracted additional information; and
   extracting the broadcast data from the content based on the identified advertisement data,
   wherein the additional information is inserted at at least one optimal interval of an audio signal of the advertisement data determined based on a result of inserting test additional information at analysis intervals of the audio signal, and
   wherein the test additional information is used to determine the at least one optimal interval that avoids causing an error by inserting the test additional information and minimizes an audio quality deterioration caused by inserting the test additional information.

2. The method of claim 1, wherein the additional information includes:
   identification information for searching for the additional information;
   time information for indicating positions of the at least one optimal interval; and
   time difference information for indicating a time difference between a starting point in time of the audio signal, an ending point in time of the audio signal, and the positions of the at least one optimal interval.

3. The method of claim 1, wherein the advertisement data has a preset play time.

4. The method of claim 3, wherein an amount of the search time for extracting the analysis intervals is less than an amount of the play time.

5. The method of claim 1, wherein the avoiding of the error comprises avoiding causing a bit error rate (BER) by inserting the test additional information.

6. The method of claim 1, wherein the minimizing of the audio quality comprises minimizing an objective difference grade (ODG) caused by inserting the test additional information, and the ODG is measured based on a perceptual evaluation of audio quality (PEAQ).

7. The method of claim 1, wherein the extracting of the additional information comprises:
   extracting the additional information by searching for analysis intervals of a first portion of the audio signal; and
   extracting the additional information from analysis intervals of a last portion of the audio signal by priorly searching for an interval subsequent to a preset search time from the at least one optimal interval at which the extracted additional information is inserted among the analysis intervals of the first portion.

8. The method of claim 1, wherein the identifying of the advertisement data comprises:
   identifying a point in time for the at least one optimal interval at which the extracted additional information is inserted; and
   identifying a starting point in time and an ending point in time of the advertisement data based on the identified point in time for the at least one optimal interval and time difference information included in the additional information.

9. The method of claim 1, wherein the extracted broadcast data is reproduced.

10. The method of claim 1, wherein the additional information is inserted as an audio watermark.

11. A content processing system, comprising:
    a memory storing instructions;
    at least one digital signal processor configured to:
      execute the instructions to receive content including broadcast data and advertisement data,
      extract additional information from the received content,
      identify the advertisement data in the content based on the extracted additional information, and extract the broadcast data from the content based on the identified advertisement data, wherein the additional information is inserted at at least one optimal interval of an audio signal of the advertisement data determined based on a result of inserting test additional information at analysis intervals of the audio signal, and wherein the test additional information is used to determine at least one optimal interval that avoids causing an error by inserting the test additional information and minimizes an audio quality deterioration caused by inserting the test additional information.

12. The system of claim 11, wherein the additional information includes:

identification information for searching for the additional information;

time information for indicating positions of the at least one optimal interval at which the additional information is inserted; and time difference information for indicating a time difference between a starting point in time of the audio signal, an ending point in time of the audio signal, and the positions of the at least one optimal interval.

13. The system of claim 11, wherein the advertisement data has a preset play time.

14. The system of claim 13, wherein an amount of the search time for extracting the additional information is less than the amount of a play time.

15. The system of claim 11, wherein the error is avoided by avoiding causing a bit error rate (BER) by inserting the test additional information.

16. The system of claim 11, wherein the audio quality deterioration is minimized by minimizing an objective difference grade (ODG) caused by inserting the test additional information, and the ODG is measured based on a perceptual evaluation of audio quality (PEAQ).

17. The system of claim 11, wherein the processor is further configured to:

extract the additional information by searching for analysis intervals of a first portion of the audio signal, and extract the additional information from analysis intervals of a last portion of the audio signal by priorly searching for an interval subsequent to a preset search time from the at least one optimal interval at which the extracted additional information is inserted among the analysis intervals of the first portion.

18. The system of claim 11, wherein the processor is further configured to:

determine a point in time for the at least one optimal interval, and identify a starting point in time and an ending point in time of the advertisement data based on the identified point in time for the at least one optimal interval and time difference information included in the additional information.

* * * * *